(12) United States Patent
Froehlich

(10) Patent No.: US 9,414,250 B2
(45) Date of Patent: Aug. 9, 2016

(54) DETERMINING QUALITY OF EXPERIENCE CONFIDENCE LEVEL FOR MOBILE SUBSCRIBERS

(71) Applicant: Tektronix, Inc., Beaverton, OR (US)

(72) Inventor: Robert W. Froehlich, McKinney, TX (US)

(73) Assignee: Tektronix Texas, LLC, Westford, MA (US)

( * ) Notice: Subject to any disclaimer, the term of this patent is extended or adjusted under 35 U.S.C. 154(b) by 113 days.

(21) Appl. No.: 14/508,693

(22) Filed: Oct. 7, 2014

(65) Prior Publication Data

US 2015/0098352 A1   Apr. 9, 2015

Related U.S. Application Data

(60) Provisional application No. 61/888,324, filed on Oct. 8, 2013.

(51) Int. Cl.
*H04W 24/08* (2009.01)
*H04W 36/00* (2009.01)
*H04L 12/24* (2006.01)

(52) U.S. Cl.
CPC ........... *H04W 24/08* (2013.01); *H04L 41/5009* (2013.01); *H04W 36/0083* (2013.01)

(58) Field of Classification Search
CPC ............. H04W 24/08; H04W 36/0083; H04L 41/5009
See application file for complete search history.

(56) References Cited

U.S. PATENT DOCUMENTS

| | | | | |
|---|---|---|---|---|
| 2003/0219037 | A1* | 11/2003 | Toskala | H04W 28/22 370/496 |
| 2009/0135737 | A1* | 5/2009 | Vikberg | H04L 12/66 370/254 |
| 2010/0071027 | A1* | 3/2010 | Agulnik | H04L 63/104 726/1 |
| 2011/0153842 | A1* | 6/2011 | Chuang | H04L 65/1069 709/227 |
| 2013/0107834 | A1* | 5/2013 | Dutta | H04W 76/005 370/329 |

* cited by examiner

*Primary Examiner* — Jianye Wu
(74) *Attorney, Agent, or Firm* — Locke Lord LLP; Scott D. Wofsy; Christopher J. Capelli

(57) ABSTRACT

A method, computer program product and system for determining quality of experience indicator in a telecommunication network including core network and radio access network (RAN) are provided. Quality of service indicators for a subscriber's session associated with the core network are received. Quality characteristics of a radio signal transmitted through the RAN or obtained from the user equipment and correlated to the subscriber's session are determined. A quality of experience indicator is generated for the subscriber's session based on the quality of service indicators for the core network and the quality characteristics of the radio signal.

20 Claims, 4 Drawing Sheets

DETERMINING QUALITY OF EXPERIENCE CONFIDENCE LEVEL FOR MOBILE SUBSCRIBERS

CROSS REFERENCE TO RELATED APPLICATIONS

This application claims the benefit of the filing date of U.S. Provisional Patent Application Ser. No. 61/888,324 titled "Determining Quality of Experience Confidence Level for Mobile Subscribers" and filed Oct. 8, 2013.

FIELD OF THE INVENTION

This specification is directed, in general, to network monitoring, and, more particularly, to systems and methods for determining quality of experience confidence level for mobile subscribers.

BACKGROUND OF THE INVENTION

Network monitoring and customer experience monitoring solutions are widely accepted standards for the operations of carrier service provider networks across both fixed networks (e.g., Cable/MSO, IP broadband such as DSL, FTTH, etc.) and mobile networks (e.g., 2.5 G, 3 G, LTE, etc.). These systems monitor network traffic via probe devices that collect user and control plane signaling from telecommunication networks, then process that traffic through a variety of stages to derive actionable information as it pertains to subscriber experience (quality of service, quality of experience), subscriber behavior (application usage, service usage, etc.), subscriber location, etc. In practice, actionable information may refer to statistical indicators (typically referred to as Key Performance Indicators or KPIs) that are computed from source data processed by the probes, and then made available to various different user constituents at the carrier for the purpose of driving their business processes.

A few examples of KPIs include Handover Success (by node, location, etc.), Call Drop Ratio (by node, handset, etc.), Application Usage (by node, subscriber, etc.), Subscriber Count (by location, demographic, etc.), and the like.

However, quality implies the process of delivering data in a reliable and timely manner, where the definition of reliable and timely is dependent upon the type of traffic being addressed. A casual user doing occasional Internet browsing may have a different definition of Quality of Service than a large business user access and downloading databases or financial files. Therefore, Quality of Service is a continuum defined by the network performance characteristics, applications of the users and the particular service level agreements of the users.

Quality of Experience (QoE) is a measure of a customer's experiences using mobile network services. QoE takes into account the needs and the desires of the subscribers when using a mobile service. For example, an operator may provide reliable data services corresponding to high Quality of Service values, (QoS), but the users may still perceive a low QoE. Since majority of communication problems happen in the radio access network (i.e. RAN) of communication networks, these QoS reports typically do not factor in the impacts of a poor RAN performance due to cell congestion or coverage.

Accordingly, it would be advantageous to provide a more accurate method of estimating subscribers' Quality of Experience characteristics in a wireless telecommunication network.

SUMMARY OF THE INVENTION

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, a method and system for determining quality of experience indicator in a telecommunication network including, but not limited to, a core network and radio access network (RAN) is described in which an illustrated embodiment includes receiving quality of service indicators for a subscriber's session associated with the core network and determining subscriber quality characteristics of a radio signal transmitted through the RAN and correlated to the subscriber's session. A quality of experience indicator is generated for the subscriber's session based on the quality of service indicators for the core network and the subscriber quality characteristics of the radio signal.

In another aspect, a computer program product for determining quality of experience indicator in a telecommunication network including a core network and radio access network (RAN) is provided. The computer program product includes one or more computer-readable storage devices and a plurality of program instructions stored on at least one of the one or more computer-readable storage devices. The plurality of program instructions includes program instructions to receive quality of service indicators for a subscriber's session associated with the core network. The plurality of program instructions further includes program instructions to determine subscriber quality characteristics of a radio signal transmitted through the RAN and correlated to the subscriber's session. The plurality of program instructions further includes program instructions to generate a quality of experience indicator for the subscriber's session based on the quality of service indicators for the core network and the subscriber quality characteristics of the radio signal.

Additional aspects may include that the determining quality characteristics of a radio signal comprises monitoring radio access bearer signaling. Additionally, the determining quality characteristics of a radio signal may further comprise determining cell coverage and capacity for a cell serving the subscriber's session. Still further, the quality of service indicators for the subscriber's data, voice or video session may comprise, TCP latency value, RTT (round trip time) value, UDP/RTP jitter values, UDP/RTP latency values, calculated MOS score, and the like.

BRIEF DESCRIPTION OF THE DRAWINGS

The accompanying appendices and/or drawings illustrate various, non-limiting, examples, inventive aspects in accordance with the present disclosure.

DETAILED DESCRIPTION OF CERTAIN EMBODIMENTS

Figure 1:
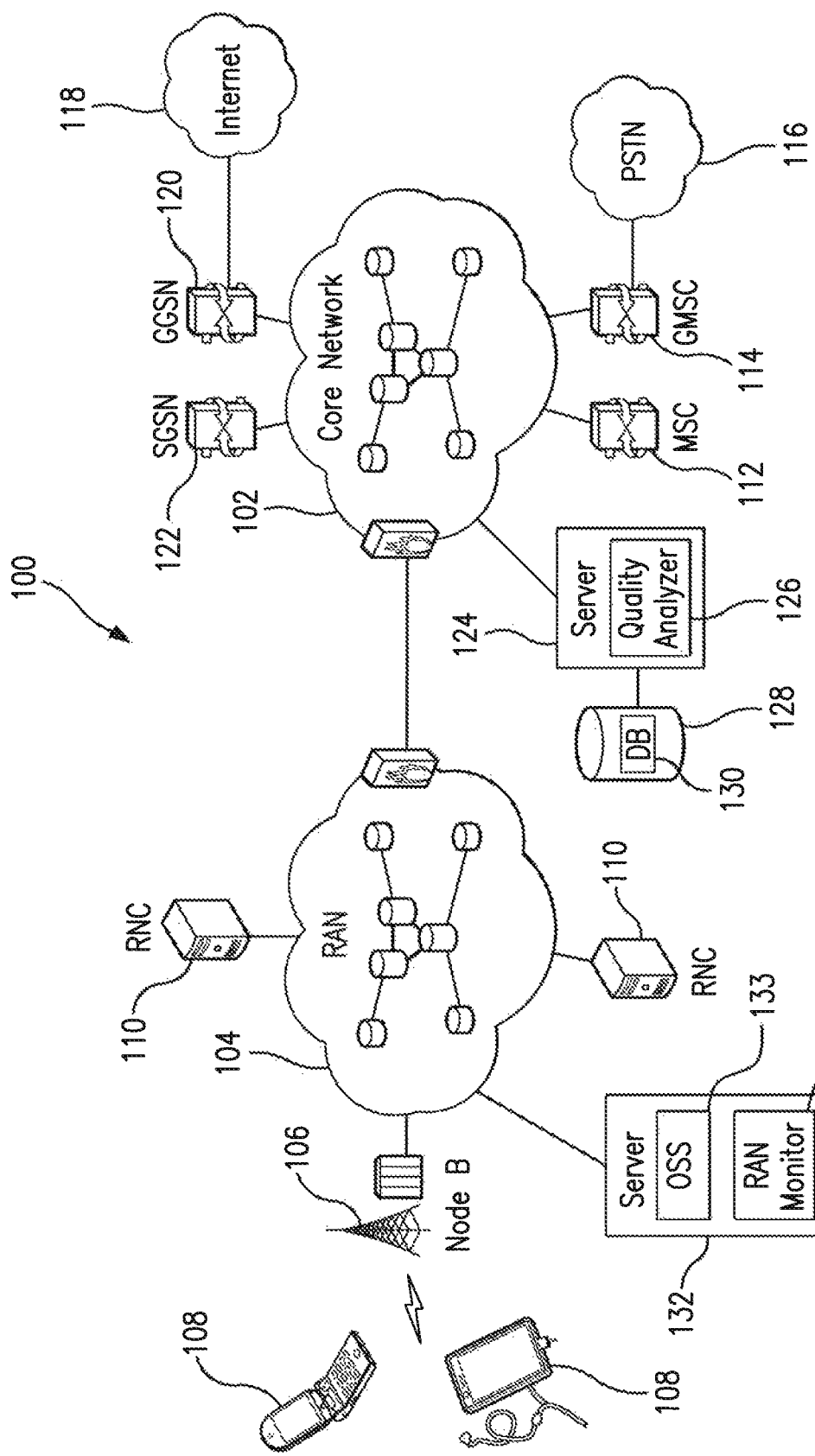
FIG. 1 illustrates an example communication network in accordance with an illustrated embodiment.

The present invention is now described more fully with reference to the accompanying drawings, in which illustrated embodiments of the present invention is shown wherein like reference numerals identify like elements. The present invention is not limited in any way to the illustrated embodiments as the illustrated embodiments described below are merely exemplary of the invention, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the present invention. Furthermore, the terms and phrases used herein are not intended to be limiting but rather to provide an understandable description of the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, exemplary methods and materials are now described. All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided may differ from the actual publication dates which may need to be independently confirmed.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the embodiments of this invention as discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features and advantages of the invention based on the above-described embodiments. Accordingly, the invention is not to be limited by what has been particularly shown and described, except as indicated by the appended claims.

A communication network is a geographically distributed collection of nodes interconnected by communication links and segments for transporting data between end nodes, such as smart phones, pads, personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others. Various embodiments of the present invention will now be described, by way of example only, and with reference to Universal Mobile Telecommunications Systems (UMTS) network 100 architecture.

FIG. 1 is a high level diagram of an example UMTS network 100, in accordance with current Third Generation Partnership Project (3GPP) and Third Generation Partnership Project 2 (3GPP2) specifications, in which an embodiment of the present invention may be implemented. The UMTS network 100 architecture includes a core network 102 interconnected with a Radio Access Network (RAN) 104 via an interface known as Iu which is defined in detail in the current publicly available 3GPP specification documents.

The RAN 104 is configured to provide wireless telecommunication services to users through User Equipments (UEs) 108 via a radio interface known as UU. The RAN 104 has base stations, known as NodeBs 106 in 3GPP, which collectively provide for the geographic coverage for wireless communications with UEs 108. In the RAN 104, groups of one or more NodeBs 106 are connected to a Radio Network Controller (RNC) 110 via an interface known as Iub in 3GPP. The RAN 104 may have several groups of NodeBs 106 connected to different RNCs 110, two are shown in the example depicted in FIG. 1. Where more than one RNC 110 is provided in a RAN, inter-RNC 110 communication is preferably performed via the Iub interface. It is noted, while the embodiments are described herein with reference to UMTS network 100 architecture and Iub protocol, the description herein is not so limited, and may be applied to a variety of interfaces including, but not limited to, Common Public Radio Interface (CPRI). In addition, most vendors of NodeBs 106 provide trace ports containing copies of specific protocol layers of the Uu interface which can be used for further protocol analysis.

Under current 3GPP specifications, the core network 102, and preferably not the RAN 104, is configured with connectivity to external systems such as Public Land Mobile Networks (PLMN), Public Switch Telephone Networks (PSTN) 116, Integrated Services Digital Network (ISDN) and other Real Time (RT) services via an RT service interface. Core network 102 will also support Non-Real Time (NRT) services with the Internet 118. Under current 3GPP specifications, the core network 102 provides RT service external connectivity via a Gateway Mobile Switching Center (GMSC) 114. The core network 102 preferably provides NRT service, known as General Packet Radio Service (GPRS), external connectivity via a Gateway GPRS Support Node (GGSN) 120. In this context, a particular NRT service may actually appear to a user to be a real time communication due to the communication speed and associated buffering of the Time Division Duplex (TDD) data packets forming the communication. One example of this is voice communication via the Internet 118 which can appear to the user as a normal telephone call conducted by a switching network, but is actually being conducted using an Internet Protocol (IP) connection which provides packet data service.

To provide support for both RT and NRT services from external sources for radio linked UEs 108 in a 3GPP system, the RAN 104 typically needs to interface with the CN 102, which is the function of the Iu interface. To enable this communication, the core network 102 typically includes a Mobile Switching Center (MSC) 112 that is coupled to the GMSC 114 and a Serving GPRS Support Node (SGSN) 122 that is coupled to the GGSN 120.

The RAN 104 segment of a conventional UMTS 100 architecture is preferably split into two traffic planes known as the C- and U-planes. The C-plane carries control (signaling) traffic, and the U-plane transports user data. The over-the-air segment of the RAN 104 involves two interfaces: the Uu interface between UE 108 and NodeB 106, and the Iub interface between the NodeB 106 and RNC 110. As noted above, the back-end interface between the RNC 110 and core network 102 is referred to as the Iu interface, split into the Iu-CS for the circuit-switched connection into the MSC 112, and the Iu-PS for the packet-switched connection into the SGSN 122.

One of the most significant signaling protocols on the over-the-air segment of the RAN 104 is Radio Resource Control (RRC). RRC manages the allocation of connections, radio bearers and physical resources over the air interface. In 3GPP, RRC signaling is carried over the Radio Link Control (RLC) and Medium Access Control (MAC) UMTS protocols between the UE 108 and RNC 110. Overall, the RNC is responsible for the allocation/de-allocation of radio resources, and for the management of key procedures such as connection management, paging and handover. Over the Iub interface, RRC/RLC/MAC messaging is typically carried on a Transport Layer via Asynchronous Transfer Mode (ATM), using the ATM Adaptation Layer Type 5 (AAL5) protocol over the ATM physical layer with intermediary protocols, such as Service Specific Coordination Function (SSCF) and the Service Specific Connection Oriented Protocol SSCOP, being used above AAL5.

U-plane data (e.g. speech, packet data, circuit-switched data) uses the RLC/MAC layers for reliable transfer over the air interface (between UE 108 and RNC 110). Over the Iub segment, this data flow (user data/RLC/MAC) occurs over UMTS-specified frame protocols using the ATM Adaptation Layer Type 2 (AAL2) protocol over the ATM physical layer running (AAL2/ATM). In this context, a protocol consists of a set of rules defining how the nodes interact with each other.

Quality monitoring is an important operational scheme for service providers. In a wireless telecommunications network, such as UMTS network 100, Quality of Experience (QoE) is a measure of a customer's experiences using mobile services. QoE takes into account the needs and the desires of the subscribers when using a mobile service. For example, an operator may provide reliable data services corresponding to high Quality of Service values, (QoS), but the users may still perceive a low QoE. This phenomenon may be explained by the fact that QoS statistics are typically measured by a monitoring point in the core network 102. However, core network 102 typically has very few data transport issues. Since majority of communication problems happen in the RAN 104 segment of UMTS 100, these core network 102 quality reports typically do not factor in the impacts of a poor RAN 104 performance due to congestion or coverage. Some examples of RAN 104 impairments that could greatly influence QoE measurements include, but not limited to, delays due to radio bearer scheduling, packet delay and drops in uplink(UP) or downlink (DL) signal paths due to RAN cell congestion or coverage issues, buffer overflow due to coverage issues, radio cell capacity due to congestion, and the like.

Advantageously, various embodiments of the present invention contemplate a quality monitoring system that timely and accurately evaluates quality of both core network 102 and RAN 104 and provides more accurate QoE estimations. According to an embodiment of the present invention, this quality monitoring system may include, but not limited to, two server types operatively coupled to each segment of UMTS network 100 and these servers may communicate with each other. As shown in FIG. 1, first server 124 may be communicatively connected to the core network 102. In an embodiment of the present invention, first server 124 may comprise, or otherwise may cooperate with a quality analyzer software program 126. Quality analyzer 126 may comprise program instructions stored on one or more computer-readable storage devices, which may include internal storage on the first server 124. In an embodiment of the present invention, the quality analyzer 126 could comprise a component of a deep packet inspection and control device for performing real-time traffic management on a real-time packet data stream, by monitoring, for example, but not limited to, Gn and Gi interfaces. In an alternative embodiment, the quality analyzer 126 may comprise a component of a monitoring probe with a physical layer application analyzer (Layer 1 according to OSI model). A plurality of communication sessions including data transfer sessions, Voice-over-IP (VoIP) and video communication (including video on demand) and streaming audio and video sessions, such as, but not limited to, interactive video conferencing sessions may be transmitted across UMTS network 100. Quality analyzer 126 may be, for example, a computer program or program component capable of providing certain information about each mobile subscriber' perceived QoE, as described in more detail below. Data gathered, generated, and maintained for use by the quality analyzer 126 may be kept in the internal storage of the first server 124 or in one or more databases 130 of a storage unit 128.

According to an embodiment of the present invention, quality analyzer 126 may be capable of providing accurate QoE information by communicating with second server 132. As shown in FIG. 1, second server 132 may be communicatively connected to the RAN 104. In an embodiment of the present invention, second server 132 may comprise, or otherwise may cooperate with a RAN monitor software program 134. RAN monitor 134 may comprise program instructions stored on one or more computer-readable storage devices, which may include internal storage on the second server 132. RAN monitor 134 may be, for example, a computer program or program component capable of capturing certain quality related information with respect to RAN 104, in real time. RAN monitor 134 may be configured and operable to transmit captured data to quality analyzer 126 for subsequent analysis, as described in more detail below. Additionally, the second server 132 may include an operational support system (OSS) 133 that may comprise a set of programs to provide, among other functions, control and analyzing functions that may be utilized by RAN monitor 134.

It is noted that the UE 108 is depicted in FIG. 1 as a mobile wireless device such as a cell phone or smart phone. However, it may be any portable device, such as a laptop, notebook, tablet computer, palm-sized computer, or any electronic device with capability to receive communication (i.e. wireless) signals.

Those skilled in the art will understand that any number of nodes, devices, links, etc. may be used in the computer network, and that the view shown herein is for simplicity. Also, while the embodiments are shown herein with reference to UMTS network 100 architecture, the description herein is not so limited, and may be applied to a variety of radio access networks such as WiFi, Femto, and the like. For purposes of the present patent application, the RAN 104 may be implemented in any combination of known or heretofore unknown radio access technology and network protocols. For instance, the RAN 104 may comprise a combination of UMTS Terrestrial Radio Access Network (UTRAN), Wireless Local Area Network (WLAN), Digital Enhanced Cordless Technology (DECT), GSM EDGE Radio Access Network (GERAN), Worldwide Interoperability for Microwave Access (WiMAX) network, Device to Device (D-D), etc. The RAN can also be an aggregation of channels from multiple bands in the radio access technology LTE-A (Long Term Evolution-Advanced), also known as fourth generation (4G) networks. LTE-A is a set of enhancements to the UMTS that includes an all-IP networking architecture and the ability of each NodeB to connect to multiple core networks. The RAN 104 depicted in FIG. 1 includes one or more NodeBs 106, each NodeB 106 providing wireless access to a respective service coverage region. In alternative embodiments, the RAN 104 may include other types of access points that include relays, femtocells and picocells.

Figure 2:
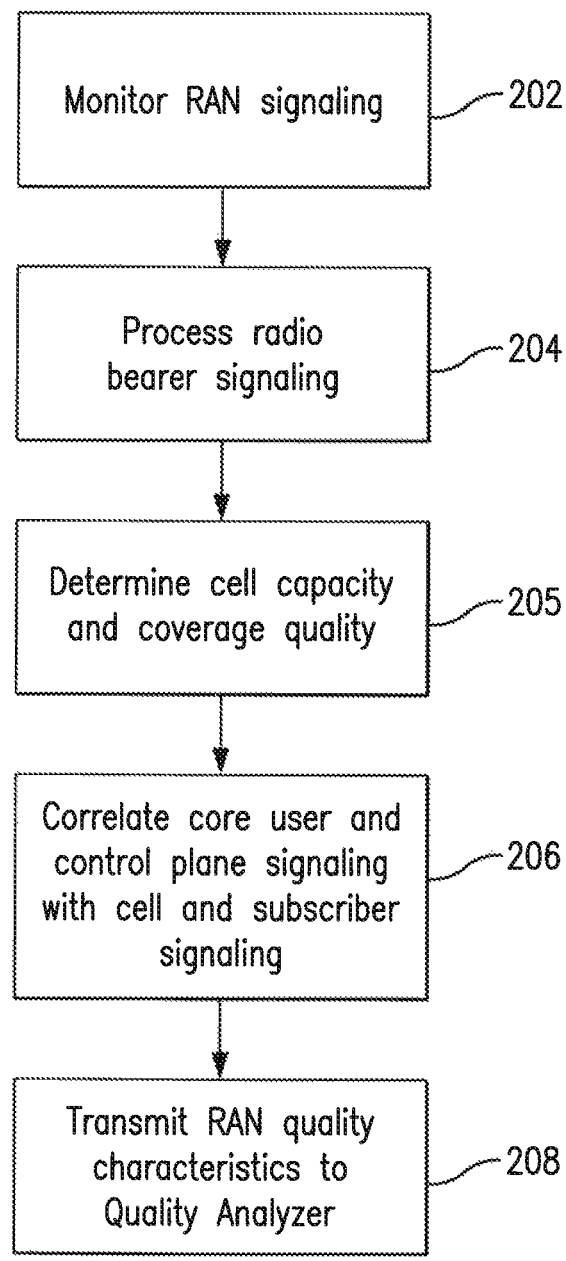
FIG. 2 is a flowchart of operational steps of a RAN monitor program of FIG. 1 in accordance with illustrative embodiments of the present invention.

FIG. 2 is a flowchart of operational steps of a RAN monitor program 134 used in the quality monitoring system of FIG. 1 in accordance with illustrative embodiments of the present invention. At 202, RAN monitor 202 preferably monitors C-plane (control signaling) traffic in the RAN 104. 3GPP introduces new features to help UMTS and LTE system operators to further optimize network planning in a cost-effective way. Minimization of Drive Test (MDT) is one of the features where UEs 108 collect measurements and report measurement information to their serving NodeBs 106 and serving RNCs 110. The data collected by the UE 108 may include, for each signal detected, the signal source's identification information, such as an identifier or the signal's frequency; the signal's average signal strength; the standard deviation of its signal strength; and its yield, which is a measure of how often the signal is detected over a given time period. When monitoring, the UE 108 may collect a plurality of samples, or "polls", of the detectable signals. In addition to collecting signal-related information, the UE 108 may collect a plurality of control parameters. For example, when the mobile subscriber initiates or receives a call or text message, radio communication takes place between the handset and NodeB 106. As well as transmitting an encoding of the message passing between caller and call recipient, the UE 108 and the NodeB 106 transmit a large amount of control information between themselves for the purposes of reliably and efficiently supporting the call and passing it between NodeBs 106 as the user moves about. This control information may contain information on the signal strength of neighboring NodeBs 106, timing advance information to instruct UEs 108 further from the NodeB 106 to transmit earlier in order to match its time slot, transmission error rates and much more. Collectively these parameters are referred to herein as the "control parameters". From this information, the RAN monitor 134 determines accurate information related to the radio bearer signaling. In an alternative embodiment, RAN monitor 202 may collect control parameters from RNC's 110 interfaces such as Iub and/or other network equipment.

In one aspect of the present invention, control parameters collection is managed by a centralized server, such as second server 132. In one embodiment, the second server 132 is a centralized server that contains a central database (not shown in FIG. 1), which contains user-related and subscription-related information. The functions of second server 132 include functionalities such as mobility management, call and session establishment support, user authentication and access authorization. In the example of FIG. 1, second server 132 stores both system and subscriber signaling information, which is subsequently processed by RAN monitor 134.

At step 204, RAN monitor 202 preferably identifies radio bearer (RB) and radio access bearer (RAB) signaling information that may be analyzed in order to determine quality of service in the RAN 104. Such information includes, but not limited to neighbor cell handover parameters. Neighbor cell handover parameters include the target cell P-CCPCH (Primary Common Control Physical Channel, the first common control physical channel), RSCP (Received Signal Code Power) and OTD (Observed Time Difference). RAN monitor 202 may use RSCP for quality assessment, as described below. Another parameter that may be used for quality assessment is a ratio of signal power (or carrier energy) to noise power (Ec/No) for a signal broadcast from each NodeB 106.

It is noted that Hybrid Automatic Repeat Request (HARQ) is commonly used in modern communications systems on top of the physic layer in order to mitigate errors that occur during transmission of data. For instance, the High Speed Downlink Packet Access for Wideband Code Division Multiple Access (WCDMA) and LTE networks use HARQ at the physical layer to mitigate errors that occur during transmission of data. In general, in HARQ systems, an incorrectly received data block (e.g., a packet) is retransmitted and all transmissions for the data block are jointly decoded. More specifically, in a HARQ system, a transmitter sends a transmission of data to a receiver. If the receiver is unable to successfully decode the transmission, the receiver sends a negative acknowledgement (NACK) to the transmitter over a reverse control channel. In response, the transmitter performs a HARQ retransmission. For type-I HARQ, which is sometimes referred to as Chase Combining (CC), the retransmission comprises the same bits sent in the initial transmission. For type-II HARQ, sometimes referred to as HARQ with incremental redundancy, new bits are added to the retransmission. This process is repeated until the receiver has successfully decoded the transmission or a maximum allowable number of retransmissions have been performed. Accordingly, in some embodiments RAN monitor 202 may determine signal quality based on the following Uu signaling parameters: HARQ, BER (bit error rate) and BLER (block error rate). Additionally, RAN monitor 202 may utilize RTWP (received total wideband power), credit analysis, and the like.

At 205, RAN monitor 134 determines cell capacity and coverage performance, on a per cell basis, based on the information obtained and processed at 202 and 204. RAN monitor 134 may analyze Radio Access Network Application Part (RANAP), Access Link Control Application Part (ALCAP), RRC, Node B Application Part (NBAP) transactions for cell capacity and radio bearer degradation. For example, the data collected from the RAN may allow RAN monitor 134 to determine the quality of a cell, such as the number subscribers attached to the cell. RAN monitor 134 may automatically identify radio access requests and may identify the top congested cells. In one embodiment, information collected from UEs 108 may be processed to identify issues such as excessive interference, and coverage and capacity limitations, for example, by utilizing RSCP and Ec/No values for each cell. These issues may cause call drops, call setup failures, low throughput, intermittent data services, etc. In an embodiment of the present invention, RAN monitor 134 may use various OSS cell-based counters provided by OSS 133 (shown in FIG. 1) to obtain and determine cell capacity and coverage performance. In an alternative embodiment, RAN monitor 134 may determine cell capacity and coverage performance based on a combination of aforesaid OSS counters and Uu signaling parameters.

At 206, RAN monitor 134 preferably correlates core network's 102 user and control plane signaling information with cell and subscriber signaling information. In an embodiment of the present invention, this step involves correlating subscriber's temporary and permanent identity information. For example, a Mobile Subscriber ISDN Number (MSISDN) is the number that callers dial to reach a mobile subscriber. The International Mobile Station Identity (IMSI) is a unique, non-dialable, number allocated to each mobile subscriber that identifies the subscriber and his or her subscription within the network.

As another example, in LTE each UE 108 is going to have at least one unique ID, for example, radio network temporary identifiers (RNTIs). Each UE 108 can be respectively allocated one or more types of RNTIs. For example, UE 108 can be allocated a cell RNTI (C-RNTI) for regular dynamic scheduling in the cell in which the UE 108 is being served, a semi-persistent scheduling RNTI (SPS-RNTI) for semi-persistent scheduling in the serving cell, a temporary cell RNTI (T-RNTI) for identification of a UE 108 as it transitions between two neighboring cells (e.g., a handoff), a system information (SI-RNTI) for the transmission and/or reception of system information, a paging RNTI (P-RNTI) for identifying a UE 108 for transmission and/or reception of paging information, a random access RNTI (RA-RNTI) for identifying a UE 108 in a random access response, etc. Other types of RNTIs can be allocated to a UE 108 to uniquely identify the UE 108 with respect to some parameter of operation. The present disclosure is not limited to the specific types of RNTIs described herein. The RNTI(s) is/are used by the UEs 108 and serving cells for a plurality of purposes, including as a downlink control channel, wherein the UE 108 can determine that downlink is intended for the UE 108 based on the RNTI. In other words, if there is UE 108 specific control content, then the UE 108 has to use its own RNTI to determine if the control content is intended for the UE 108. Accordingly, in step 206, RAN monitor 134 preferably correlates temporary RAN 104 identifiers, such as RNTIs, used for identification of a UE 108 with permanent identifiers, such as MSISDN and IMSI used for mobile subscriber's identification in the U-plane of the core network 102. It is noted that U-plane sessions typically utilize subscriber's IP address. Hence, RAN monitor 134 may bind such IP addresses to a corresponding cell serving subscriber's UP session. Various correlation and binding techniques are well-known in the art and, therefore, are not described in detail herein.

In addition, after correlating the aforementioned temporary identifiers with permanent identifiers, at 206, RAN monitor 134 may further correlate mobile subscriber's identifications with various cells that might be serving a particular communication session (i.e., video conference). In other words, RAN monitor 134 may correlate mobile subscribers to one or more cells. For example, in a soft handover scenario, a subscriber may have multiple access bearers for multiple cells. Thus, in steps 202-206, RAN monitor 134 collects various information indicative of radio signals quality in the RAN 104. At 208, RAN monitor 134 preferably transmits these determined RAN 104 service quality characteristics to quality analyzer program 126. In an embodiment of the present invention, RAN service quality characteristics may include RSCP, Ec/No, cell capacity and coverage information, and the like.

Figure 3:
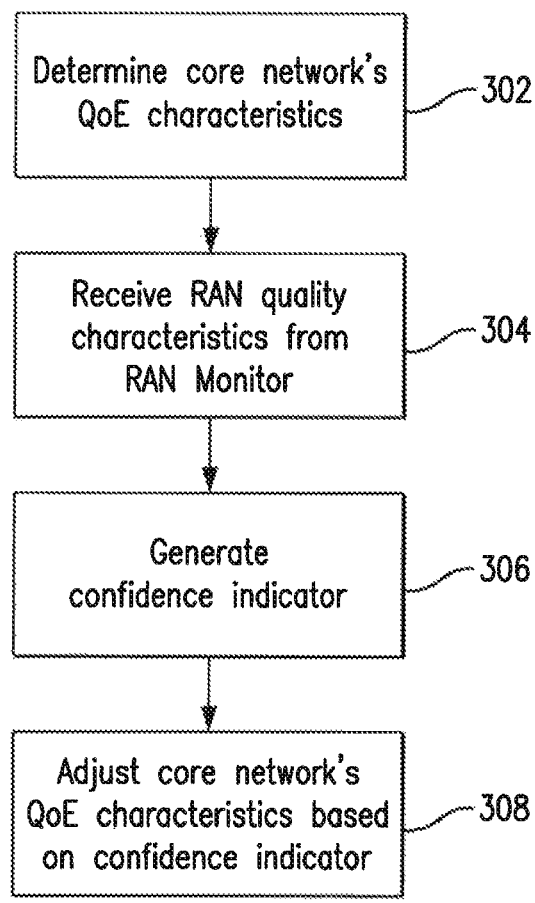
FIG. 3 is a flowchart of operational steps of a quality analyzer program of FIG. 1 in accordance with illustrative embodiments of the present invention.

FIG. 3 is a flowchart of operational steps of a quality analyzer program 126 used in the quality monitoring system of FIG. 1 in accordance with illustrative embodiments of the present invention. At 302, quality analyzer 126 preferably monitors one or more core network's 102 quality characteristics. In an embodiment of the present invention, this step may involve quality analyzer 126 monitoring key performance indicators (KPIs) associated with the plurality of communication sessions. A KPI of a session for a particular subscriber is indicative of a supply of application data needed to maintain a satisfactory quality of experience for the subscriber's session. Quality analyzer 126 may monitor voice and video media quality information such as mean opinion score (MOS), packet jitter, packet loss, latency, delay among other metrics. The KPIs which are relevant to monitor will depend on the type of communication session being monitored. In case of a video session, quality analyzer program 126 may calculate a corresponding MOS value. MOS is an industry standard metric for measuring QoE having a scale of 1-5. Various techniques for monitoring KPIs in the core network 102 are well-known in the art and, therefore, are not described in detail herein.

At 304, quality analyzer 126 preferably receives RAN service quality characteristics from the RAN monitor 134. As noted above, RAN service quality characteristics may include RSCP (power of coverage indicator), Ec/No (interference indicator), cell capacity and coverage information, and the like. Next, quality analyzer 126 preferably maps the received quality characteristics to a particular subscriber session being monitored.

At 306, quality analyzer 126 preferably generates a confidence indicator. The confidence indicator indicating the level of confidence in a corresponding quality characteristic (e.g., KPI value) may be generated using a number of different methods. The confidence indicator values may use any weighting number system. As an example, at step 306, quality analyzer 126 may use "High", "Moderate" and "Low" values as confidence indicators, based on the information it received at 304. For instance, quality analyzer 126 may generate "High" confidence indicator if RSCP value is greater than approximately −100 dBm, Ec/No value is greater than approximately −12 dBm and the cell quality is good. Moreover, quality analyzer 126 may generate "Moderate" confidence indicator if RSCP value ranges between approximately −90 dBm and approximately −105 dBm, Ec/No value ranges between approximately −9 dBm and approximately −16 dBm and the cell quality (as measured by cell capacity and coverage information) is marginal. Additionally, quality analyzer 126 may generate "Low" confidence indicator if RSCP value is around or below approximately −105 dBm, Ec/No value is around or below approximately −16 dB and the cell has unacceptable interference quality.

It is noted that quality analyzer 126 may use any method of associating RAN data known in the art. For example, quality analyzer 126 may utilize timing advance techniques to provide an estimate of distance from the cell site. The only requirement is that the confidence indicators are linked somehow with the quality characteristic estimates to which they correspond.

At 308, quality analyzer 126 optionally may adjust core network's quality characteristics value based on the confidence indicator value generated at 306. As an example, if quality analyzer 126 has determined (at 302) MOS metric value for subscriber's downlink voice session (in core network 102) to be equal 4.0 and the received RAN quality characteristics (at 304) indicate that the subscriber location is in a covered area and that UE 108 reports good power (coverage) and signal to noise (congestion) levels, the resultant confidence indicator generated at 306 preferably indicates "High" confidence and thus quality analyzer 126 may report MOS value unadjusted, i.e. 4.0. On the other hand, if radio signal quality characteristics indicate degradation in either coverage or congestion levels (or both) and the generated confidence indicator is "Low" then, at 308, quality analyzer 126 may reduce the measured MOS value to 3.0, for instance. Alternatively, quality analyzer 126 may report both the measured MOS value and generated confidence indicator to a user.

Advantageously, the various embodiments described herein provide a more accurate method of estimating subscribers' Quality of Experience characteristics in a wireless telecommunication network. The aforementioned embodiments use radio network impairments as weighting factors to provide enhanced KPIs.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 4:
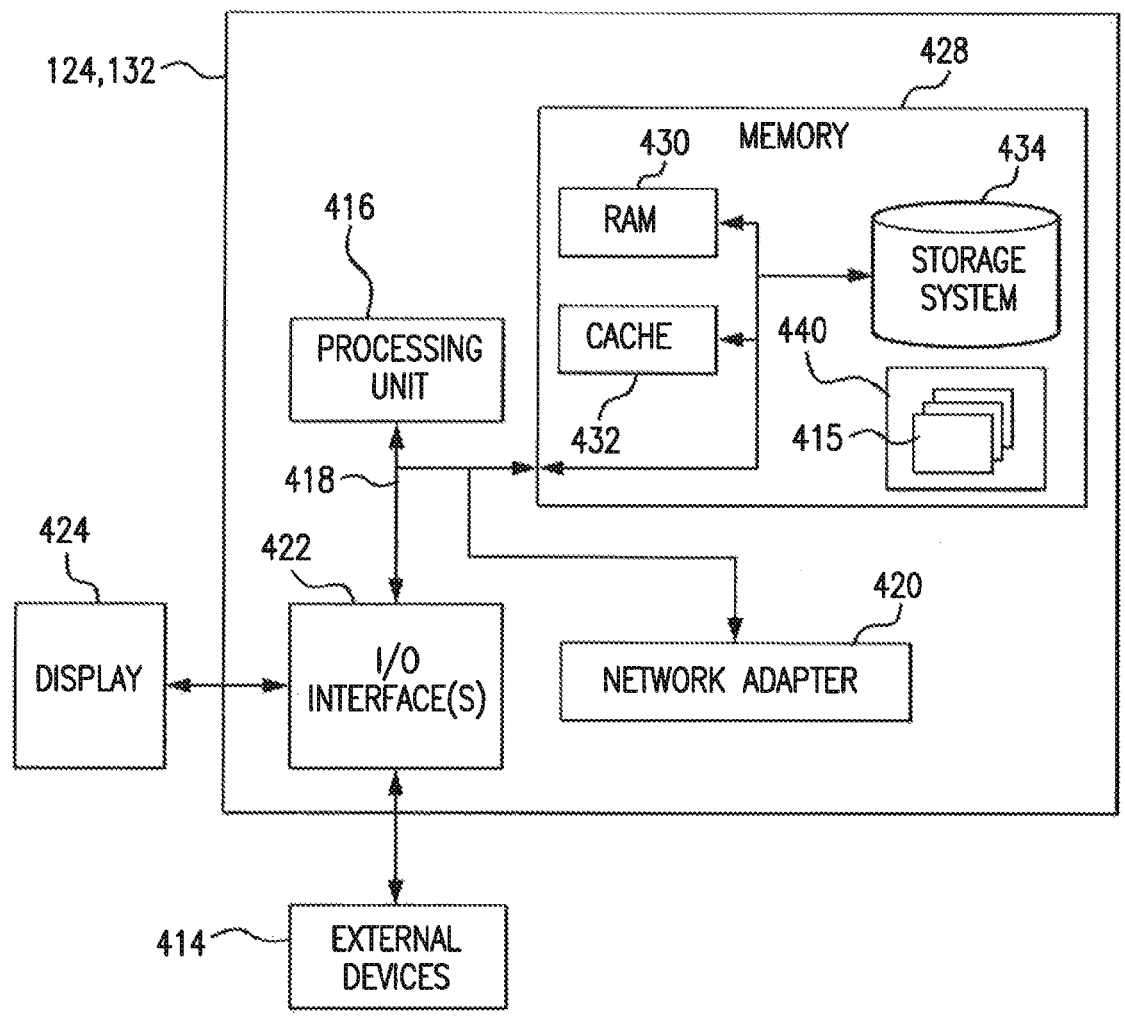
FIG. 4 illustrates internal and external components of server computers of FIG. 1 in accordance with an illustrative embodiment of the present invention.

FIG. 4 illustrates internal and external components of the first 124 and second 132 servers in accordance with an illustrative embodiment. The servers 124 and 132 are only examples of a suitable server computer and are not intended to suggest any limitation as to the scope of use or functionality of embodiments of the invention described herein. Regardless, the servers 124 and 132 are capable of being implemented and/or performing any of the functionality set forth hereinabove.

The servers 124 and 132 are operational with numerous other general purpose or special purpose computing system environments or configurations. Examples of well-known computing systems, environments, and/or configurations that may be suitable for use with the servers 124 and 132 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed data processing environments that include any of the above systems or devices, and the like.

The servers 124 and 132 may be described in the general context of computer system-executable instructions, such as program modules, being executed by a computer system. Generally, program modules may include routines, programs, objects, components, logic, data structures, and so on that perform particular tasks or implement particular abstract data types. The servers 124 and 132 may be practiced in distributed data processing environments where tasks are performed by remote processing devices that are linked through a communications network. In a distributed data processing environment, program modules may be located in both local and remote computer system storage media including memory storage devices.

The servers 124 and 132 are shown in FIG. 4 in the form of a general-purpose computing device. The components of the servers 124 and 132 may include, but are not limited to, one or more processors or processing units 416, a system memory 428, and a bus 418 that couples various system components including the system memory 428 to the processor 416.

The bus 418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

The servers 124 and 132 typically include a variety of computer system readable media. Such media may be any available media that is accessible by the servers 124 and 132, and it includes both volatile and non-volatile media, removable and non-removable media.

The system memory 428 can include computer system readable media in the form of volatile memory, such as random access memory (RAM) 430 and/or cache memory 432. The servers 124 and 132 may further include other removable/non-removable, volatile/non-volatile computer system storage media. By way of example only, a storage system 434 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 418 by one or more data media interfaces. As will be further depicted and described below, the memory 428 may include at least one program product having a set (e.g., at least one) of program modules that are configured to carry out the functions of embodiments of the invention.

A program/utility 440, having a set (at least one) of program modules 415, such as the quality analyzer 126 and RAN monitor 134, may be stored in the memory 428 by way of example, and not limitation, as well as an operating system, one or more application programs, other program modules, and program data. Each of the operating system, one or more application programs, other program modules, and program data or some combination thereof, may include an implementation of a networking environment. Program modules 415 generally carry out the functions and/or methodologies of embodiments of the invention as described herein.

The servers 124 and 132 may also communicate with one or more external devices 414 such as a keyboard, a pointing device, a display 424, etc.; one or more devices that enable a user to interact with the servers 124 and 132; and/or any devices (e.g., network card, modem, etc.) that enable the servers 124, 132 to communicate with one or more other computing devices. Such communication can occur via Input/Output (I/O) interfaces 422. Still yet, the servers 124, 132 can communicate with one or more networks such as a local area network (LAN), a general wide area network (WAN), and/or a public network (e.g., the Internet) via a network adapter 420. As depicted, the network adapter 420 communicates with the other components of the servers 124, 132 via the bus 418. It should be understood that although not shown, other hardware and/or software components could be used in conjunction with the servers 124, 132. Examples, include, but are not limited to: microcode, device drivers, redundant processing units, external disk drive arrays, RAID systems, tape drives, and data archival storage systems, etc.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for determining quality of experience indicator in a telecommunication network including core network and radio access network (RAN) signaling, the method comprising the steps of:
receiving quality of service indicators for a subscriber's session associated with the core network, the quality of service indicators characterizing core network conditions for the subscriber's session;
determining, by a processor, quality characteristics of a radio signal transmitted through the RAN and correlated to the subscriber's session ,the quality characteristics of the radio signal characterizing RAN network conditions for the subscriber's session; and
generating a quality of experience indicator for the subscriber's session based on a combination of the quality of service indicators for the core network and the quality characteristics of the radio signal.

2. The method of claim 1, wherein said core network comprises an Internet Protocol (IP) network.

3. The method of claim 1, wherein determining quality characteristics of a radio signal comprises analyzing radio bearer and radio access bearer signaling.

4. The method of claim 1, wherein determining quality characteristics of a radio signal comprises determining cell coverage and capacity for a cell serving the subscriber's session.

5. The method of claim 2, wherein quality of service indicators for the subscriber's session comprise at least one of: TCP latency value, round trip time (RTT) value, user datagram protocol (UDP) jitter value, real-time transport protocol (RTP) jitter value or calculated MOS score.

6. The method of claim 1, wherein the subscriber's session includes at least one of data content, voice over internet protocol ("VOIP") content, video on demand ("VOD") content, streaming audio content, or streaming video content.

7. The method of claim 3, wherein said analyzing radio bearer and radio access bearer signaling comprises analyzing a plurality of neighbor cell handover parameters.

8. The method of claim 3, wherein said analyzing radio bearer and radio access bearer signaling comprises determining signal quality based on a plurality of Uu interface signaling parameters.

9. The method of claim 1, wherein the quality characteristics of the radio signal are correlated to the subscriber's session by correlating subscriber's temporary identity information with subscriber's permanent identity information.

10. A computer program product for determining quality of experience indicator in a telecommunication network including a core network and radio access network (RAN), the computer program product comprising:
one or more computer-readable storage devices and a plurality of program instructions stored on at least one of the one or more computer-readable storage devices, the plurality of program instructions comprising:
program instructions to receive quality of service indicators for a subscriber's session associated with the core network, the quality of service indicators characterizing core network conditions for the subscriber's session;
program instructions to determine quality characteristics of a radio signal transmitted through the RAN and correlated to the subscriber's session, the quality characteristics of the radio signal characterizing RAN network conditions for the subscriber's session; and
program instructions to generate a quality of experience indicator for the subscriber's session based on a combination of the quality of service indicators for the core network and the quality characteristics of the radio signal.

11. The computer program product of claim 10, wherein said core network comprises an Internet Protocol (IP) network.

12. The computer program product of claim 10, wherein the program instructions to determine quality characteristics of a radio signal comprise program instructions to analyze radio bearer and radio access bearer signaling.

13. The computer program product of claim 10, wherein the program instructions to determine quality characteristics of a radio signal comprise program instructions to determine cell coverage and capacity for a cell serving the subscriber's session.

14. The computer program product of claim 11, wherein the program instructions to determine quality characteristics of a radio signal comprise program instructions to analyze operational support system (OSS) configuration and performance information.

15. The computer program product of claim 10, wherein the subscriber's session includes at least one of data content, voice over internet protocol ("VOIP") content, video on demand ("VOD") content, streaming audio content, or streaming video content.

16. The computer program product of claim 10, wherein the program instructions to analyze radio access bearer signaling comprise program instructions to analyze a plurality of neighbor cell handover parameters.

17. A computer system for determining quality of experience indicator in a telecommunication network including a core network and radio access network (RAN), the computer system comprising one or more processors, one or more computer-readable storage devices, and a plurality of program instructions stored on at least one of the one or more storage devices for execution by at least one of the one or more processors, the plurality of program instructions comprising:
program instructions to receive quality of service indicators for a subscriber's session associated with the core network, the quality of service indicators characterizing core network conditions for the subscriber's session;
program instructions to determine quality characteristics of a radio signal transmitted through the RAN and correlated to the subscriber's session, the quality characteristics of the radio signal characterizing RAN network conditions for the subscriber's session; and
program instructions to generate a quality of experience indicator for the subscriber's session based on a combination of the quality of service indicators for the core network and the quality characteristics of the radio signal.

18. The computer system of claim 17, wherein said core network comprises an Internet Protocol (IP) network.

19. The computer system of claim 17, wherein the program instructions to determine quality characteristics of a radio signal comprise program instructions to analyze radio bearer and radio access bearer signaling.

20. The computer system of claim 17, wherein the program instructions to determine quality characteristics of a radio signal comprise program instructions to determine cell coverage and capacity for a cell serving the subscriber's session.

* * * * *